US005716030A

United States Patent [19]
LaFiandra et al.

[11] Patent Number: 5,716,030
[45] Date of Patent: Feb. 10, 1998

[54] APERTURE DOOR AND CALIBRATION SOURCE FOR SPACECRAFT REMOTE SENSING DEVICES

[75] Inventors: Carlo F. LaFiandra, New Canaan; William M. Rappoport, Weston; George R. Huse, Danbury; Edward F. Zalewski, Sandy Hook, all of Conn.

[73] Assignee: Hughes Aircraft Company, Los Angeles, Calif.

[21] Appl. No.: 596,047

[22] Filed: Feb. 6, 1996

[51] Int. Cl.$^6$ ...................................... B64G 1/00
[52] U.S. Cl. .................... 244/158 R; 244/129.4; 244/129.5; 250/214 PR
[58] Field of Search .............. 244/129.4, 129.5, 244/158 R, 121; 250/203 R, 214 PR

[56] References Cited

U.S. PATENT DOCUMENTS

| | | | |
|---|---|---|---|
| 3,768,754 | 10/1973 | Janes | 250/203 R |
| 4,669,685 | 6/1987 | Dalby | 244/158 R |
| 4,753,465 | 6/1988 | Dalby | 244/158 R |

*Primary Examiner*—Virna Lissi Mojica
*Attorney, Agent, or Firm*—W. C. Schubert; W. K. Denson-Low

[57] ABSTRACT

A spacecraft telescope door (10) adapted for use with remote sensing devices requiring optical and infrared calibration. The door (10) includes a first calibration surface (24) disposed on a first panel (14) for providing a radiant temperature reference for infrared calibrations. A second calibration surface (26) is disposed on a second panel (12) for providing an absolute radiance reference for optical calibrations. A panel hinge (16) controls the relative position of the panels (12,14) with respect to each other, and an aperture hinge (20) controls the relative position of the panels with respect to the aperture (28). In a specific embodiment, the first surface (24) is painted with chemglaze Z306, a highly emissive paint with a low reflectance for facilitating infrared calibration. The second surface (26) is painted with YB71, a diffuse reflective paint for facilitating optical calibration. In the illustrative embodiment, the panel hinge (16) and the aperture hinge (20) are motorized for controlling the relative orientation of the panels (12,14) and the aperture (28). By controlling the orientation of the panels (12,14) and the aperture (28), the first surface (24) and the second surface (26) may be accurately positioned for infrared and optical calibrations respectively. In addition, the panels (12,14) may be positioned so as to protect the diffuse second surface (26) from ultraviolet degradation, as most white diffuse paints degrade with prolonged exposure to ultraviolet light. In addition, the first panel (24) may contain heaters and temperature sensors (25) for control of the radiant temperature.

20 Claims, 7 Drawing Sheets

FIG. 2
FIG. 3
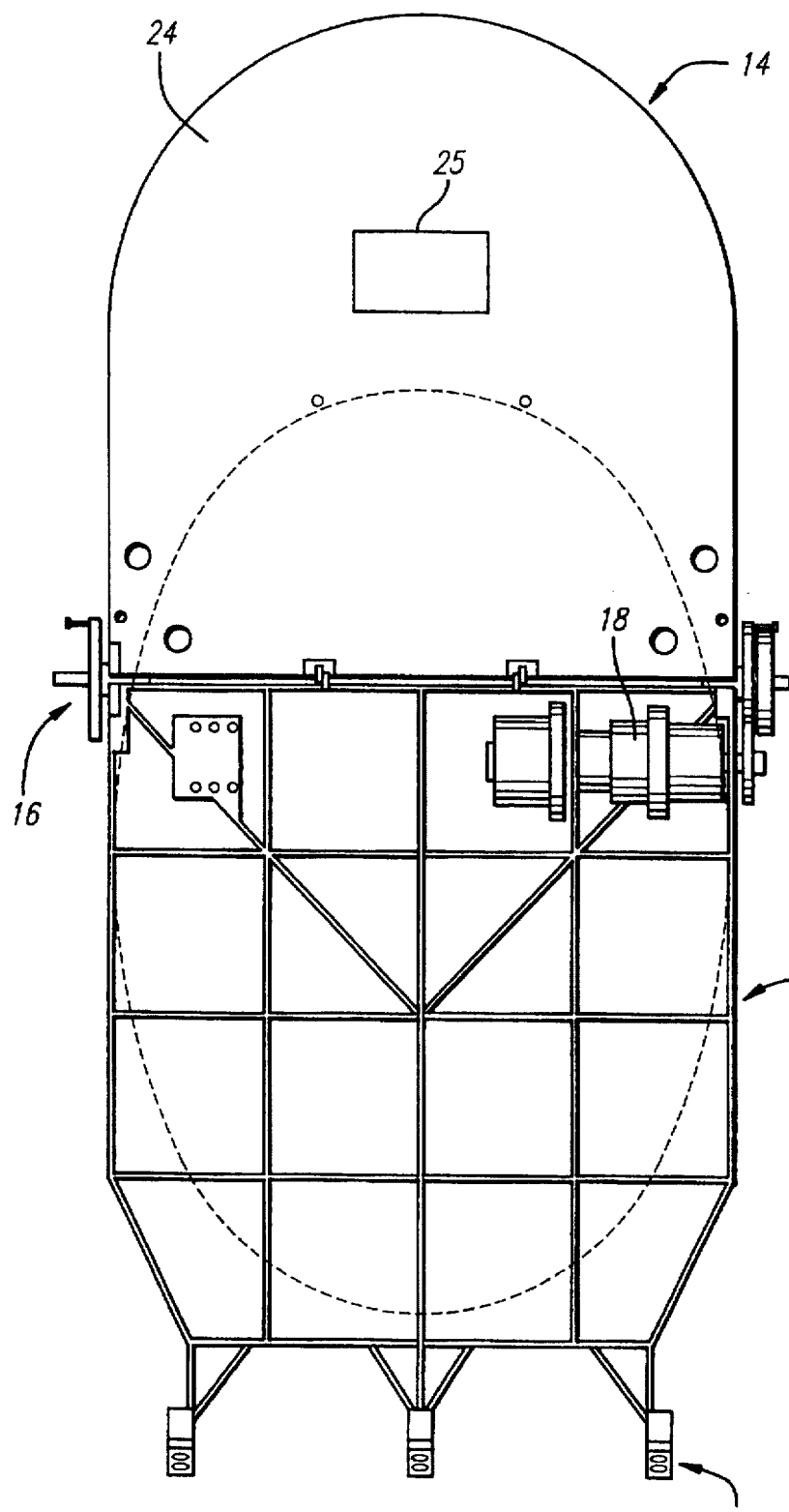
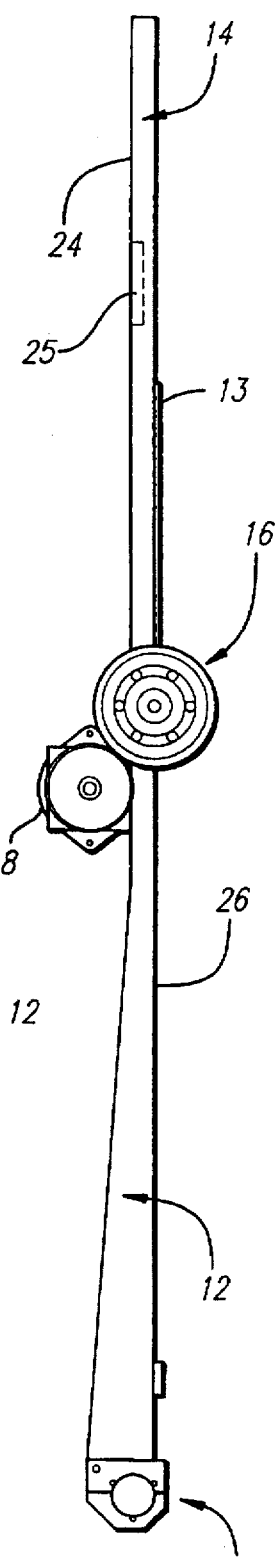

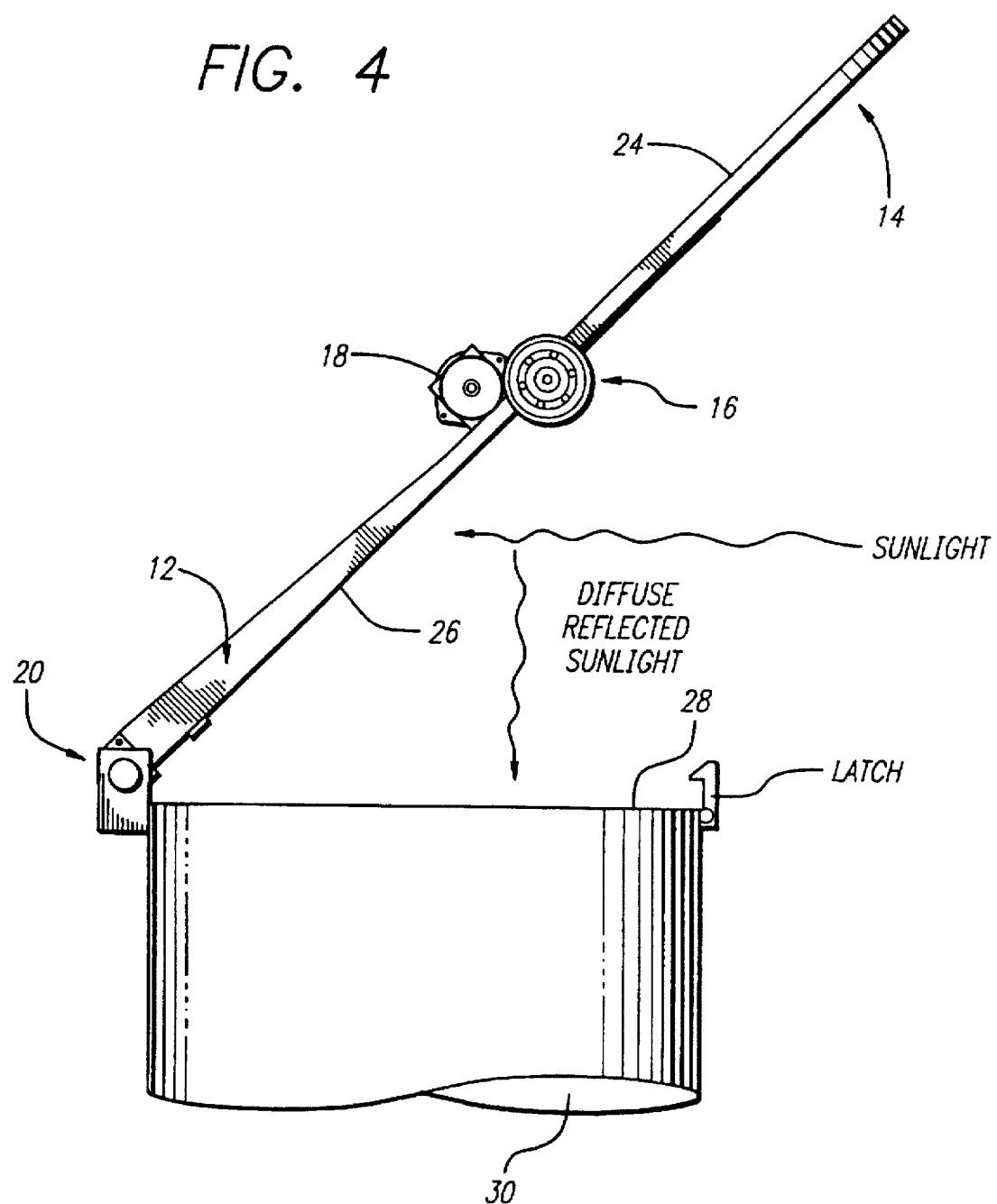

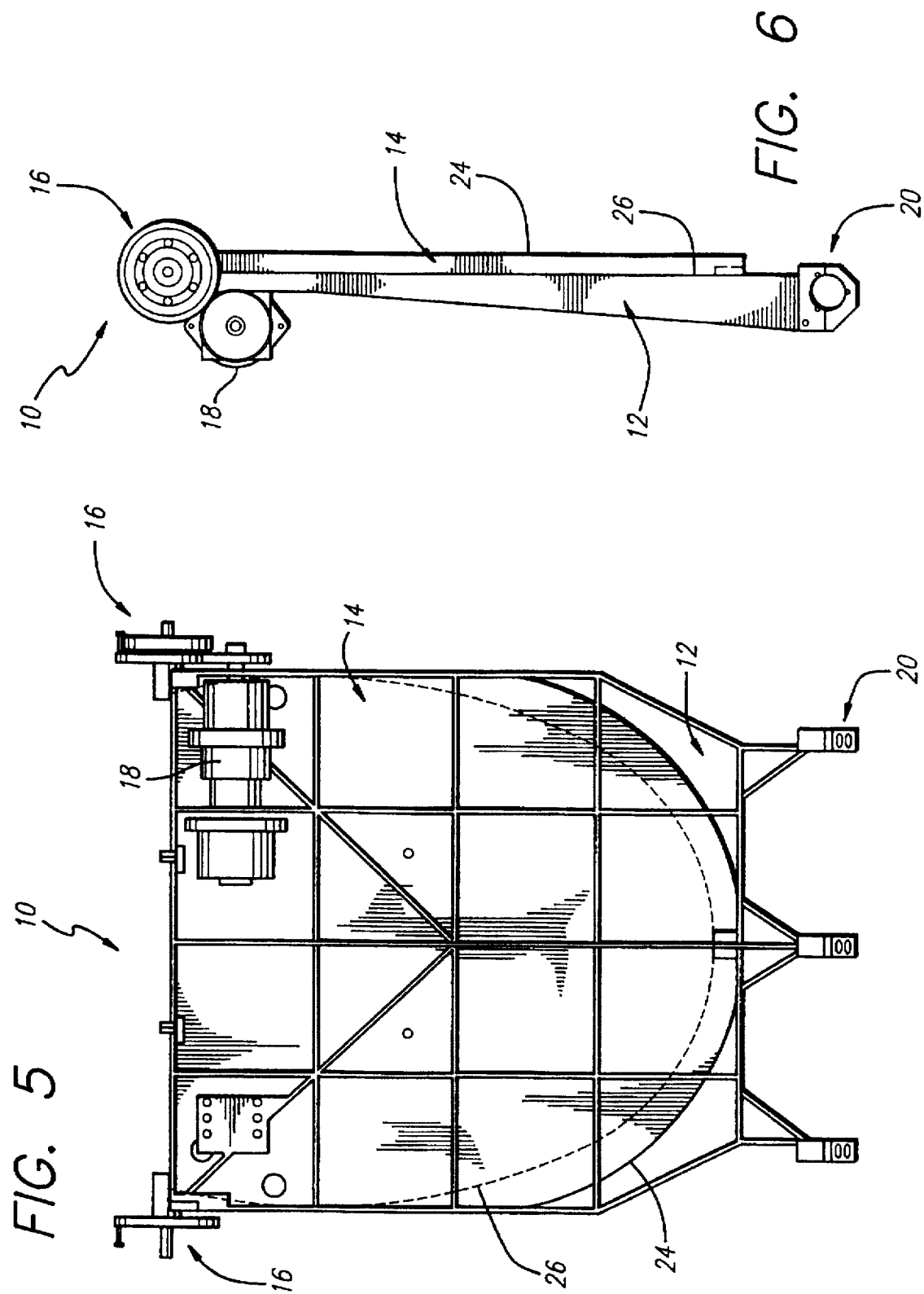

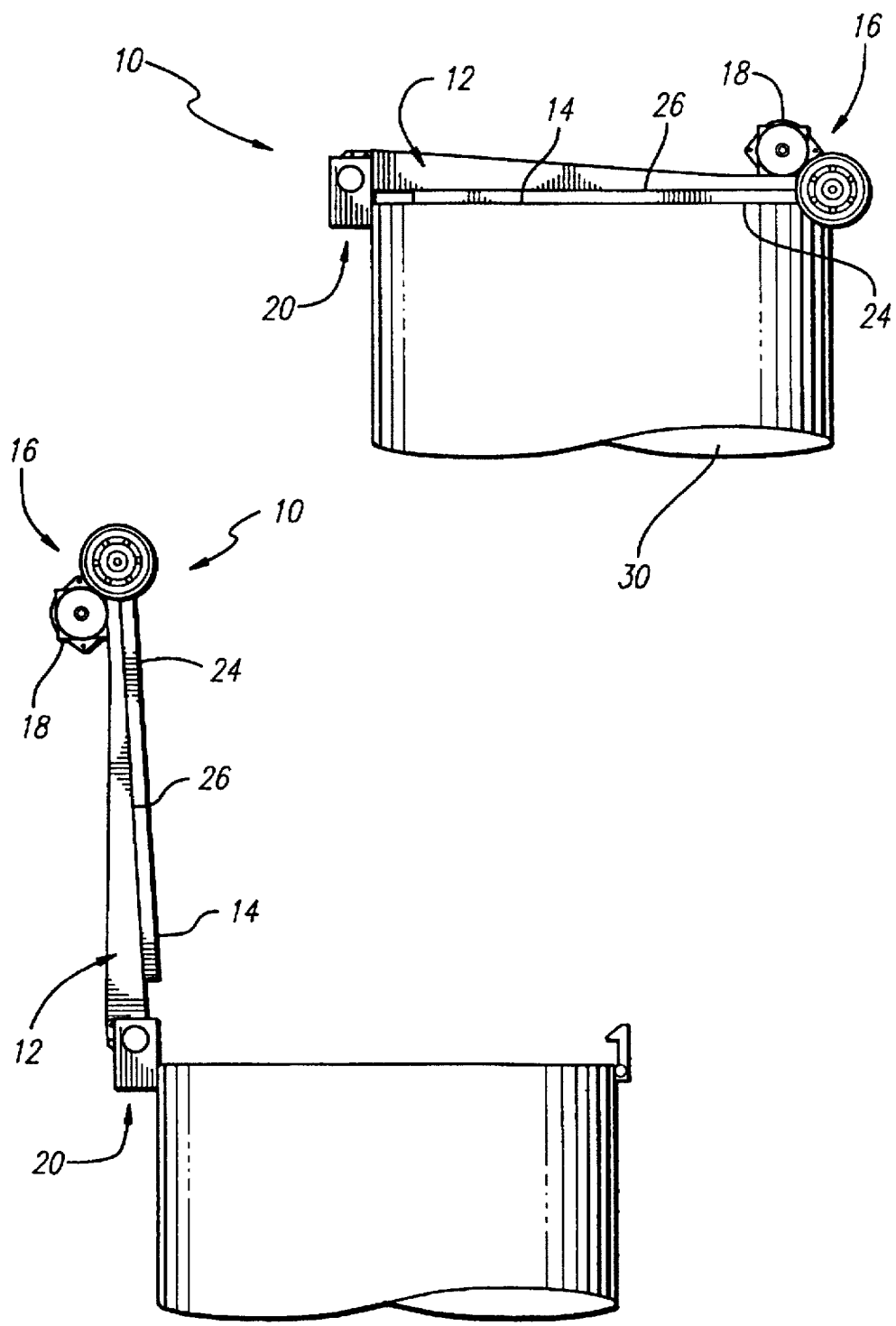

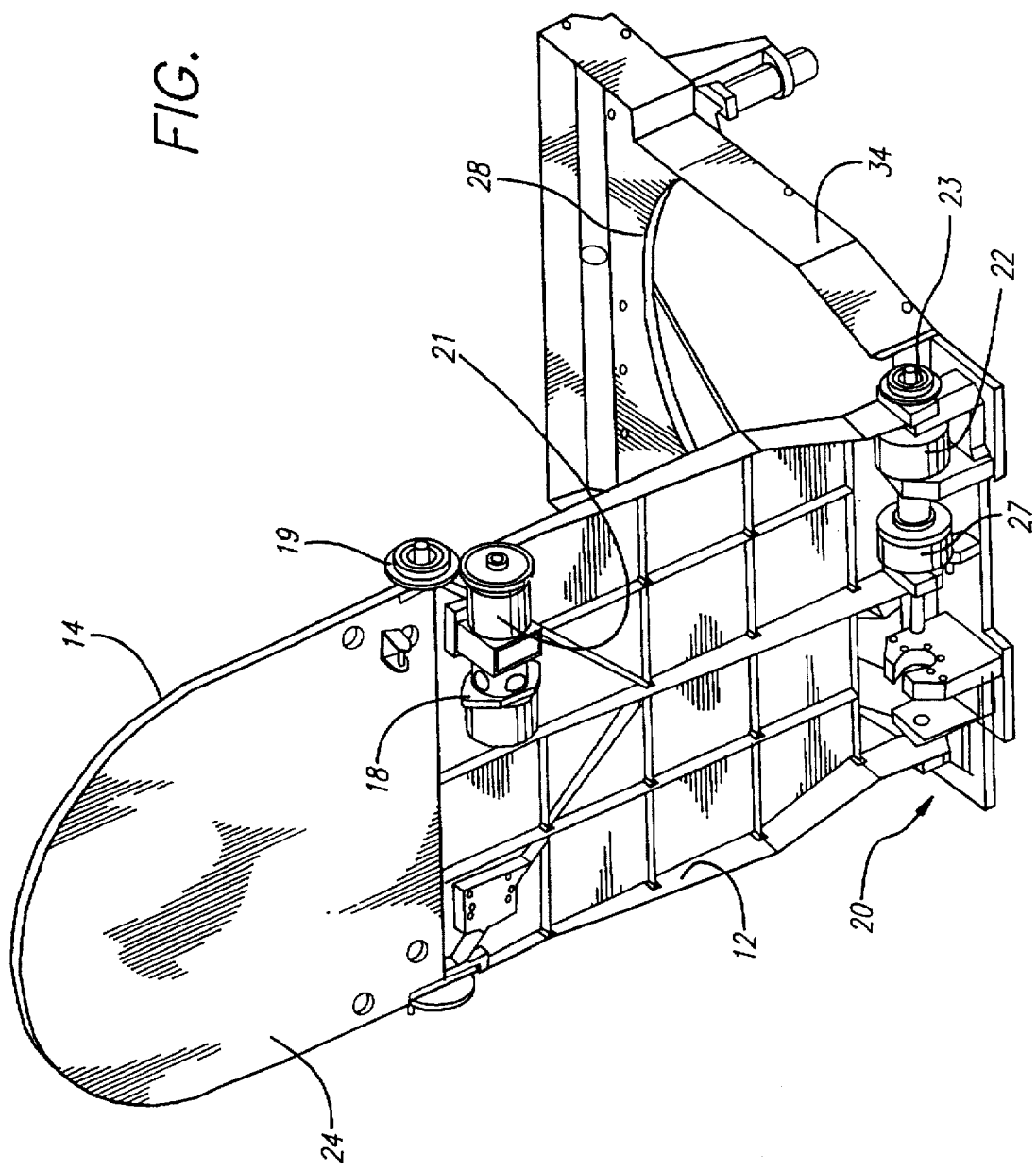

APERTURE DOOR AND CALIBRATION SOURCE FOR SPACECRAFT REMOTE SENSING DEVICES

BACKGROUND OF THE INVENTION

1. Field of Invention

This invention relates to spacecraft telescope doors and energy calibration sources. Specifically, the present invention relates to aperture doors of remote energy sensing devices such as infrared and optical telescopes and associated energy calibration mechanisms.

2. Description of the Related Art

Spacecraft such as probes and satellites generally support an energy detecting capability of one type or another. Information carried via electromagnetic energy such as light or radiant heat is acquired and/or communicated. Remote sensing devices such as infrared, optical, and radio telescopes are widely used to receive such information. The information may then be encoded into digital form to facilitate further processing.

Present remote sensing devices and associated electronic hardware typically require calibration. Infrared and optical references and associated surfaces are used to facilitate calibration of spacecraft remote sensing devices. For example, a black body source is typically used to calibrate infrared telescopes and devices. The sun is often reflected off of a photo-emissive surface for an absolute radiance or brightness reference.

In an effort to provide calibration mechanisms on space craft, swinging assemblies were developed. One assembly contains an infrared radiant temperature reference implemented as a surface painted with an emissive black paint. A second assembly contains a diffuse white surface for reflecting sunlight into the remote sensing aperture for providing an absolute radiance reference for optical calibration. In order to calibrate the remote sensing devices, each assembly must be swing into place. The motion of the assemblies must be coordinated with the motion of the aperture door of the remote sensing devices. This tends to be cumbersome and inefficient adding excess weight and volume to the spacecraft.

In addition, high fidelity calibration references are difficult to obtain with the present swinging assemblies. This is due to the fact that present assemblies do not cover the entire aperture of the remote sensing device. When performing an infrared calibration, background energy from objects such as the earth may leak past the openings in the remote sensing aperture. Increased design time, and complexity are required to obtain accurate calibration from such assemblies. Also, the present art does not protect the white reflecting surfaces from degradation due to UV exposure.

Hence, there is a need in the art for a compact, space efficient assembly providing full aperture infrared and optical calibration surfaces for remote sensing devices

SUMMARY OF THE INVENTION

The need in the art is addressed by the telescope aperture door of the present invention. In the illustrative embodiment, the inventive door is adapted for use with remote sensing devices requiring optical and infrared calibration. The door includes a first calibration surface disposed on a first panel for providing a radiant temperature reference for infrared calibrations. The reverse side of this surface is fitted with heaters and temperature sensors, which may be used to control the temperature of the radiant surface. A second calibration surface is disposed on a second panel for providing an absolute radiance reference for optical calibrations. A panel hinge controls the relative positioning of the panels with respect to each other and an aperture hinge controls the relative positioning of the panels with respect to the aperture.

In a specific embodiment, the first surface is painted with chemglaze Z306, a highly emissive paint with a low reflectance for facilitating infrared calibration. The second surface is painted with YB71, a diffuse reflective paint for facilitating optical calibration.

In the illustrative embodiment, the panel hinge and the aperture hinge are motorized for controlling the relative orientation of the panels and the aperture. By controlling the orientation of the panels and the aperture, the first surface and the second surface may be accurately positioned for infrared and optical calibrations respectively. In addition, the panels may be positioned so as to protect the diffuse second surface from ultraviolet degradation, as most white diffuse paints degrade with prolonged exposure to ultraviolet light.

BRIEF DESCRIPTION OF THE DRAWINGS

FIG. 2 is a back view of the aperture door when the door is fully open and in optical calibration mode.

FIG. 3 is a is a side view of the invention of FIG. 2.

FIG. 4 shows a the relative orientation of the calibration panels with respect to each other, and with respect to the telescope aperture when the aperture door is in optical calibration mode.

FIG. 5 is a back view of the aperture door of the present invention showing the relative position of the optical panel and the infrared panel when the door is in infrared calibration mode or baffle mode.

FIG. 6 is a side view of the invention of FIG. 4 showing the infrared panel folded adjacent to the optical panel.

FIG. 7 shows the aperture door connected to the telescope aperture, with the calibration panels oriented in infrared calibration mode with respect to each other, and with respect to the telescope aperture.

FIG. 8 shows the relative orientation of the calibration panels with respect to each other, and with respect to the telescope aperture when the door is in baffle mode.

FIG. 9 shows an angled view of the door panel orientation of FIG. 2, connected to a standard aperture assembly.

DESCRIPTION OF THE INVENTION

Figure 1:
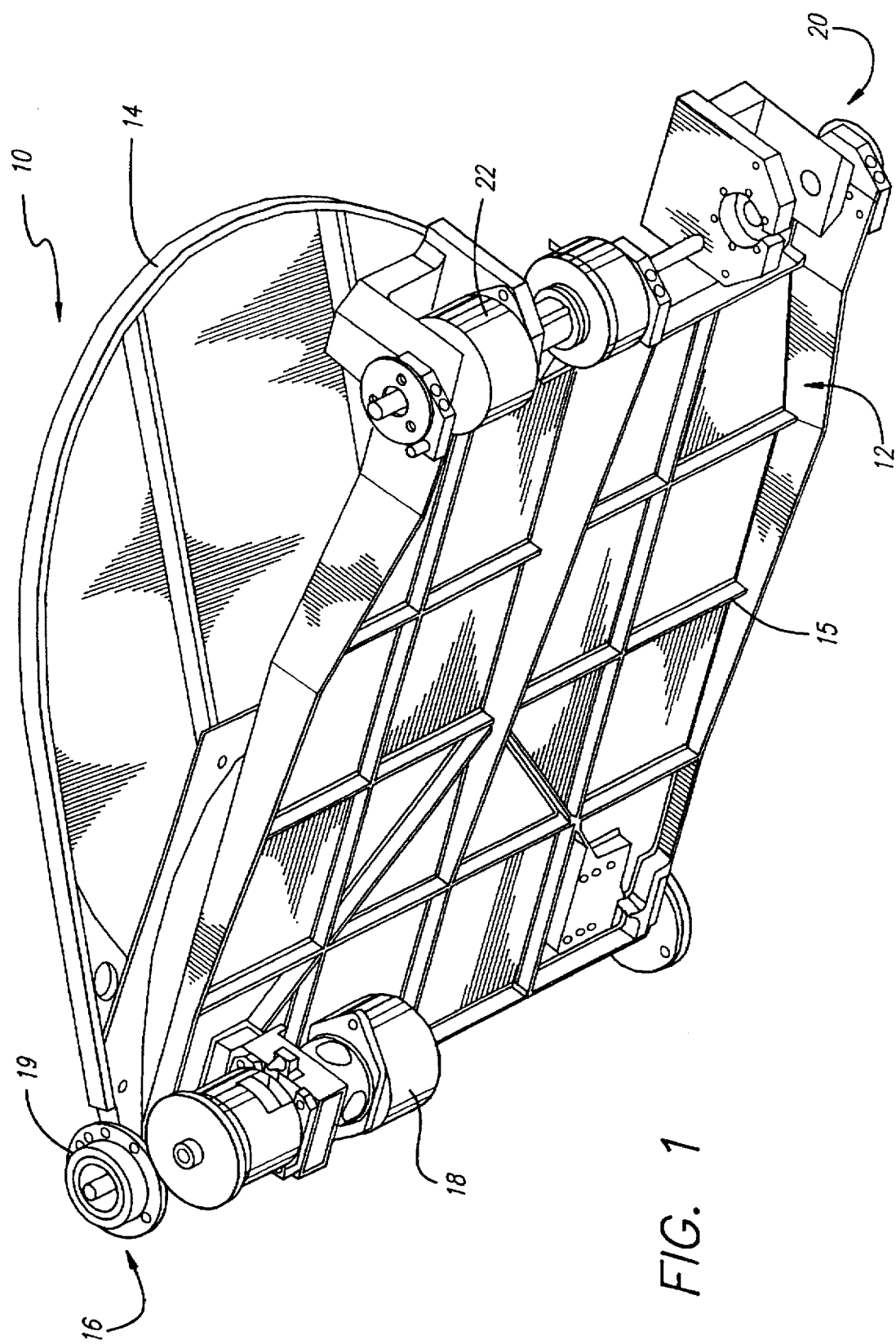
FIG. 1 is an angled view of an illustrative embodiment of the present invention showing the back of the partially open aperture door of the present invention.

The invention is described below in reference to the accompany drawings in which like reference numerals denote like parts. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is an angled view of an illustrative embodiment of the present invention showing the back of a aperture door 10. A panel hinge 16 is shown connecting an infrared panel 14 and an optical panel 12 of the door 10. An optical panel extension 13 is also connected at the panel hinge 16, and is adjacent to the back side of the infrared panel 14. The door 10 is shown partially open and not connected to the aperture (not shown). The hinge 16 includes a standard electronic panel motor 18 for controlling the position of the infrared panel 14 with respect to the optical panel 12. In the preferred embodiment, the panel motor 18 is a stepper motor that facilitates the variable positing of the infrared panel 14. The hinge 16 enables "clam shell" operation of the optical panel 12 with respect to the infrared panel 14. Those skilled in the art will appreciate that other hinges may be used for this purpose without departing from the scope of the present invention. The hinge 16 also includes an optional fail-safe mechanism 19. The fail-safe mechanism 19 is shown implemented as a standard spring and clutch mechanism. A clutch 21 is shown as part of the mechanism 19. If the panel motor 18 fails to operate, and if the clutch is not energized, the spring mechanism 19 will cause the infrared panel 14 to swing closed. This permits the mission use of the telescope although without the absolute radiance optical calibration capability.

A second hinge 20 is shown connected to the end of the optical panel 12. The hinge 20 is used to connect the door 10 to a telescope aperture (not shown), and includes an aperture motor 22 for providing variable positioning of the door 10 with respect to the aperture (not shown). The hinge 20 enables "clam shell" operation of the door 10 with respect to the aperture of the telescope (not shown).

The orientation of the aperture door is controlled by the panel motor 18 and the aperture motor 22. Variable positioning capability of the infrared panel 14 and the optical panel 12 with respect to each other, and with respect to the aperture (not shown) is used to maneuver the door 10 into different operation modes. The operation modes include: baffle mode, optical calibration mode, and infrared calibration mode, as discussed in FIGS. 4, 7 and 8.

In the present embodiment, the optical panel 12 and the infrared panel 14 are constructed of aluminum that has been ribbed in order to reduce the weight of the door 10. Ribs 15 are shown on the back of the optical panel 12. The aluminum panels may be constructed in an ordinary machine shop. The aluminum panels also provide high thermal conductivity, which ensure uniform radiance from the infrared calibration panel.

FIG. 2 is a back view of the aperture door when the door is fully open and in optical calibration mode. The infrared panel 14 has an infrared calibration surface 24 that is painted with an emissive black coating that acts as a good black body source. The surface 24 provides a radiant heat reference for infrared equipment in the telescope (not shown). The coating may be chemglaze Z306, or other high emissivity coatings. Optional electrical heaters and temperature sensors 25 may be included in the infrared panel 14 for controlling the temperature of the surface 24.

FIG. 3 is a side view of the invention of FIG. 2 showing the placement of the panel hinge 16 and the motor with respect to the optical panel 24 and the infrared panel. The optical panel 12 and the optical panel extension 13 have an optical calibration surface 26 that is painted with a diffuse, high reflectance white paint such as YB71 or PTFE for providing an absolute radiance reference for calibrating optical equipment within the telescope (not shown). The optical panel extension 13 overlaps the backside of the infrared panel 14, for increasing he surface area of the optical calibration surface 26. The relative position of the optical calibration surface 26 with respect to the infrared calibration surface 24 is shown. The surface 24 is shown exposed to the surrounding environment. The location of the heaters and temperature sensors 25 is shown adjacent to the surface 24 in the infrared panel 14.

FIG. 4 shows the relative orientation of the calibration panels with respect to each other, and with respect to the telescope aperture when the aperture door is in optical calibration mode. The angle of the exposed surface 24 with respect to the aperture 28 may be adjusted via the hinge 20 to reflect sunlight into the full aperture 28 of the telescope. This provides an absolute radiance reference for the calibration of optical equipment within the telescope (not shown). In FIG. 4, the door is shown angled at approximately 45 degrees with respect to the aperture 28. Sunlight is shown reflected into aperture 28 for full aperture calibration of the optical devices within the telescope 30.

FIG. 5 is a back view of the aperture door of the present invention showing the relative position of the optical panel and the infrared panel when the door is in infrared calibration mode, or baffle mode. The door 10 in FIG. 2 is shown folded about the hinge 16. In this orientation, the optical calibration surface 26 (shown in phantom) is covered by the infrared panel 14. The surface 26 is painted with a white diffuse coating. White diffuse coatings used for calibration surfaces tend to break down and degrade with prolonged exposure to ultraviolet radiation from sunlight. When the door 10 is folded shut about the hinge 16, the diffuse coating of the calibration surface 26 is protected from ultraviolet degradation.

FIG. 6 is a side view of the invention of FIG. 5 showing the infrared panel 14 folded adjacent to the optical panel 12. The optical calibration surface 26 is shown protected by the infrared panel 14. The infrared calibration surface 24 and the optical calibration surface 26 are shown facing the same direction. In the present orientation, the door 10 may pivot about the hinge 20, allowing the door to enter optical calibration mode, or infrared calibration mode.

FIG. 7 shows the aperture door 10 connected to the telescope aperture 28, with the calibration panels 12,14 oriented in infrared calibration mode with respect to each other, and with respect to the telescope aperture 28. When the door 10 is folded shut, sealing the aperture 28, the door 10 is in infrared calibration mode. The interior of the telescope 30 is isolated from exterior radiant temperature sources such as earth that have posed historical problems for swinging assemblies containing calibration sources.

FIG. 8 shows the relative orientation of the calibration panels 12,14 with respect to each other, and with respect to the telescope aperture 28 when the door 10 is in baffle mode. In the baffle mode, the aperture 28 of the telescope is open to space for receiving light, infrared, or other signals. The "clam shell" formed by the infrared panel 14, and the optical panel 12 is closed as in FIG. 6 and FIG. 7, and the optical calibration surface 26 is protected from ultraviolet degradation.

FIG. 9 shows an angled view of the door panel orientation of FIG. 2, connected to a standard aperture assembly 34. The aperture assembly 34 is directly fastened to the aperture 28 of the telescope (not shown). The infrared calibration surface 24 and the optical calibration surface 26 (not shown) are shown facing opposite directions as in FIG. 3. The optical calibration surface 26 (not shown) is on the opposite side of the panel 12, and may reflect incoming light into the aperture 28 in order to provide an absolute radiance reference for optical calibration.

The hinge 20 includes a fail-safe mechanism 23 that may be implemented as a standard clutch and spring mechanism as the mechanism 19 of FIG. 1. An aperture clutch 27 is shown as part of the aperture fail-safe mechanism 23. If the aperture motor 22 fails to operate, the mechanism 23 will release the clutch, and the spring will cause the door 10 to swing open. This permits the mission use of the telescope without infrared or optical calibration of the telescope. Those skilled in the art will appreciate that other release mechanisms may be used for this purpose without departing from the scope of the present invention.

Hence, the door 10 may be easily orientated via the panel hinge 16, and the aperture hinge 20 to provide for optical and infrared calibration references. By combining the calibration surfaces 24,26 into the door 10, a high degree of compactness is achieved. The placement of the calibration surfaces 24,26 on the aperture door 10 also facilitates full aperture calibration. Full aperture calibration facilitates accurate calibrations and reduces the complexity involved in adjusting for inaccuracies in historical sub-aperture calibration.

Figure 10:
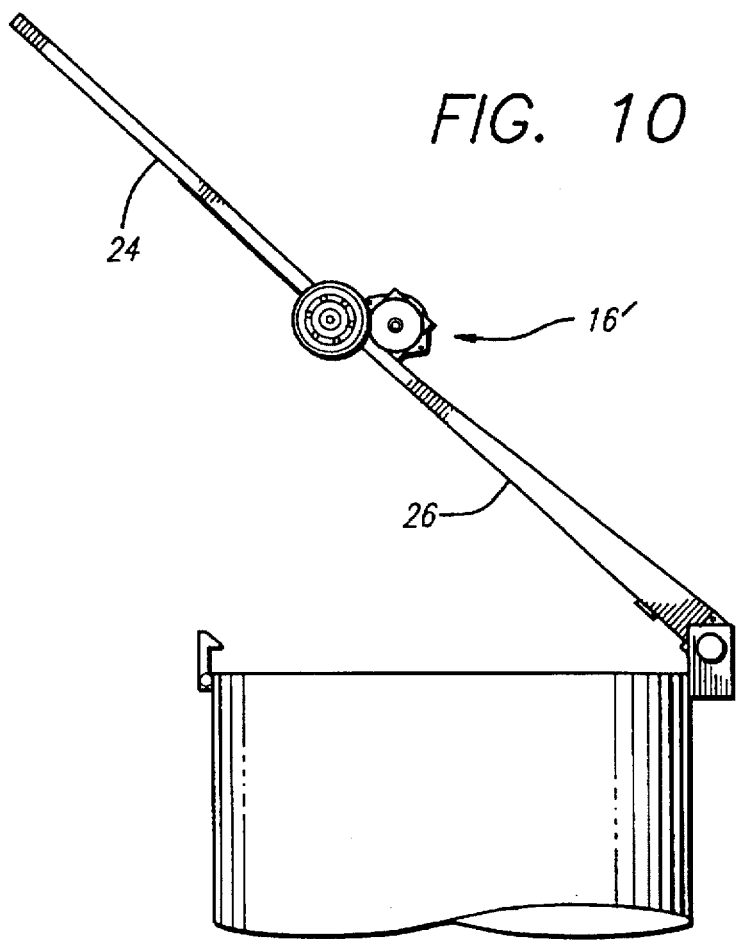
FIG. 10 shows an alternative embodiment of the present invention in optical calibration mode.

Although the description above contains many specificities, these should not be construed as limiting the scope of the invention but as merely providing illustrations of a presently preferred embodiment of the present invention. For example, FIG. 10 shows an alternative embodiment of the present invention in optical calibration mode. A panel hinge 16' is implemented with a hinge that operates along the same plane as the door 10 as opposed to "clam shell" operation. In this case, optical calibration surface 26 is oriented in the same direction as the infrared calibration surface 24, as opposed to facing the opposite direction as in the invention of FIG. 7.

Figure 11:
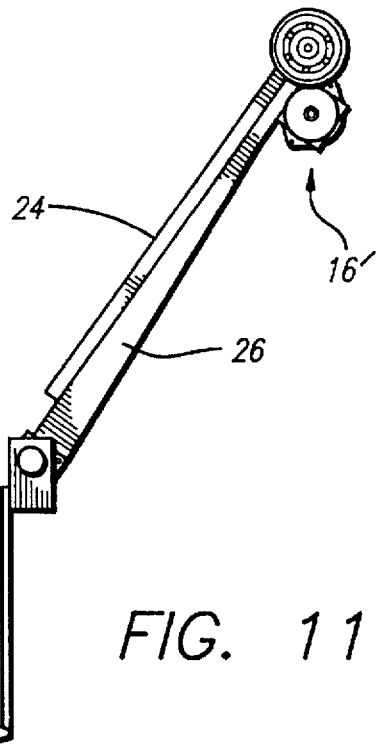
FIG. 11 shows the invention of FIG. 10 in baffle mode.

FIG. 11 shows the alternative embodiment of FIG. 10 in baffle mode. The infrared panel 14 rotates to overlap the optical panel 12. The diffuse optical coating on the panel 12 is then protected from ultraviolet light degradation.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An aperture door and calibration source for spacecraft remote sensing devices comprising:

an aperture, a panel mounted for rotational movement on said aperture for moving said panel from a first position to a second position, wherein said panel is constructed of ribbed aluminum for reducing the weight of the door, and for providing uniform temperature distribution; and means disposed on said panel for calibrating a remote sensing device.

2. The invention of claim 1 wherein at said first position said panel covers said aperture.

3. The invention of claim 1 wherein at said second position said panel is angled with respect to said aperture.

4. The invention of claim 1 wherein said panel includes a first panel and a second panel.

5. An aperture door and calibration source for spacecraft remote sensing devices comprising:

an aperture, a panel mounted for rotational movement on said aperture for moving said panel from a first position to a second position, said panel including a first panel and a second panel; and means disposed on said panel for calibrating a remote sensing device, wherein said means for calibrating includes a first calibration surface disposed on said first panel and a second calibration surface disposed on said second panel.

6. The invention of claim 5 wherein said second calibration surface is a diffuse reflective surface for providing an absolute solar radiance reference for optical calibration.

7. The invention of claim 6 wherein said second surface includes the material PTFE.

8. The invention of claim 6 wherein said second surface includes the material YB71.

9. The invention of claim 5 wherein a first hinging means is connected to said first panel and to said second panel for varying the position of said first panel with respect to said second panel.

10. The invention of claim 9 wherein said first hinging means includes a motor for varying the position of said first panel with respect to said second panel.

11. The invention of claim 9 wherein said first panel is folded over said second panel.

12. The invention of claim 9 wherein said first panel is unfolded with respect to said second panel.

13. The invention of claim 9 wherein a second hinging means is connected to said second panel and to said aperture.

14. The invention of claim 13 wherein said second hinging means includes a motor for varying the positions of said second panel and said second surface with respect to said aperture for reflecting sunlight off said second surface into said aperture for providing a full aperture absolute radiance reference for optical calibrations.

15. The invention of claim 14 wherein said door and said first panel are folded over said second panel whereby said first calibration surface completely covers said aperture.

16. The invention of claim 5 wherein said first calibration surface has a high emissivity constant and low reflectance for providing a radiant temperature reference for infrared calibration.

17. The invention of claim 16 wherein said first calibration surface is coated with chemglaze Z306.

18. The invention of claim 16 wherein first calibration surface contains heaters and temperature sensors for control of the radiant energy.

19. A method for calibrating spacecraft remote sensing devices comprising the steps of:

positioning an optical calibration surface disposed on a door mounted on an aperture of said remote sensing devices so that sunlight may be reflected into said aperture for providing an absolute radiance reference for performing optical calibrations; and positioning an infrared calibration surface disposed on said door so that said aperture is covered by said infrared calibration surface for performing infrared calibrations.

20. An aperture door and calibration source for spacecraft remote sensing devices comprising:

an aperture;

an infrared panel;

an infrared calibration surface disposed on said infrared panel;

an optical panel;

an optical calibration surface disposed on said optical panel;

a first motorized hinge connecting said infrared panel to said optical panel for varying the position of said optical panel with respect to said infrared panel; and a second motorized hinge connecting said aperture to said infrared panel for varying the positions of said optical panel and said infrared panel with respect to said aperture.

* * * * *